ively of a United States Patent [19] [11] 3,987,002
Lakshmanan [45] *Oct. 19, 1976

[54] ADHESIVE COMPOSITION
[75] Inventor: Pallavoor R. Lakshmanan, Allison Park, Pa.
[73] Assignee: Gulf Research & Development Company, Pittsburgh, Pa.
[ * ] Notice: The portion of the term of this patent subsequent to Dec. 2, 1992, has been disclaimed.
[22] Filed: July 29, 1975
[21] Appl. No.: 599,988

Related U.S. Application Data
[63] Continuation-in-part of Ser. No. 456,165, March 29, 1974, Pat. No. 3,923,722.

[52] U.S. Cl. .................. 260/32.8 A; 260/33.6 R; 260/33.8 UA; 260/42.47; 260/829; 260/880 B

[51] Int. Cl.$^2$ .................. C08K 5/01; C08K 5/02; C08K 5/07
[58] Field of Search .................. 260/32.8 A, 33.6 A, 260/33.8 UA, 42.37, 42.47, 829, 880 B

[56] References Cited
UNITED STATES PATENTS
3,923,722  12/1975  Lakshmanan .................. 260/33.6 A
3,932,327   1/1976  Naylor .......................... 260/33.6 A Primary Examiner—Lewis T. Jacobs
Assistant Examiner—H. H. Fletcher

[57] ABSTRACT
An adhesive composition consisting essentially of a styrene-butadiene radial block copolymer, a tackifier, calcium carbonate and an organic solvent or mixtures of organic solvents.

9 Claims, No Drawings

ADHESIVE COMPOSITION

This application is a continuation-in-part application of my U.S. Patent Application Ser. No. 456,165, entitled ADHESIVE COMPOSITION, filed Mar. 29, 1974 now U.S. Pat. No. 3,923,722, which application is hereby incorporated in by reference.

BACKGROUND OF THE INVENTION

1. Field of the Invention

This invention relates to an adhesive composition containing a styrene-butadiene radial block copolymer, a tackifier, calcium carbonate and an organic solvent or mixtures of organic solvents.

2. Description of the Prior Art

Adhesives have been developed for bonding wood to wood, hardboard, gypsum board, plastics, concrete and metal. Unfortunately, some of these adhesives possess low compressive shear strength and are difficult to apply to a substrate. The adhesive of this invention is not difficult to apply and yet provides good compressive shear strength and long-term aging properties.

SUMMARY OF THE INVENTION

This invention relates to an adhesive composition possessing an extremely high compressive shear strength and an extrusion rate that facilitates the application of the adhesive composition to a substrate. The composition of this invention is one consisting essentially of a styrene-butadiene radial block copolymer, a tackifier, calcium carbonate and an organic solvent or mixtures of organic solvents.

The styrene-butadiene radial block copolymers present in the adhesive composition of the present invention are composed of styrene and butadiene and have at least three long block copolymer branches radiating from a nucleus. These polymers have the following general configuration:

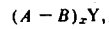

$$(A - B)_x Y,$$

wherein each terminal $A$ is a styrene polymer, $B$ is a butadiene polymer, $Y$ is a group derived from a polyfunctional compound having at least three reactive sites and $x$ is an integer ranging from 3 to 5, but preferably is 3. The amount of styrene present in the radial block copolymer will range from about five to about 60 weight per cent, preferably from about 10 to about 50 weight per cent, based on the weight of the radial block copolymer, while the amount of butadiene from about 40 to about 95 weight per cent, preferably from about 50 to about 90 weight per cent, based on the weight of the radial block copolymer. The Y group which forms the nucleus from which the polymer blocks radiate is derived from a polyfunctional compound having at least three reactive sites capable of reacting with a carbon-lithium bond. Types of polyfunctional compounds which can be used include the polyepoxides, polyisocyanates, polyimines, polyaldehydes, polyketones, polyanhydrides, polyesters, polyhalides, etc. The styrene-butadiene radial block copolymers used herein can be made in any conventional manner. A particularly attractive procedure for making the same is described in U.S. Pat. No. 3,281,383 to Zelinski et al.

The tackifier used herein can be any of the resinous substances known in the art for enhancing the tack of adhesive compositions, for example, aromatic hydrocarbon resins, at least one of whose components can be derived from petroleum or coal tar distillates. Particularly suitable are those selected from the group consisting of resins based on coumarone or indene, such as coumarone-indene resins, styrene-indene-isoprene terpolymers, etc. In general, the softening point of the tackifier will be between about 38° to about 160° C., preferably between about 70° and 155° C.

The third component is calcium carbonate having an average particle diameter of about $0.2 \times 10^4$ to about $50 \times 10^4$ A, preferably of about $2 \times 10^4$ to about $25 \times 10^4$ A.

The last component required herein is an organic solvent, or mixtures of organic solvents, boiling between about 35° to about 145° C., preferably between about 38° to about 140° C., at atmospheric pressure. Those boiling below the defined range will be released too rapidly from the adhesive composition and premature hardening of the remaining components can occur, while those boiling above the defined range can result in sagging or flow of the adhesive in use. Solvents which can be used are aromatics having from six to eight carbon atoms, such as toluene, the xylenes, etc.; aliphatics having from six to eight carbon atoms, such as normal hexane, normal octane, etc.; ketones having from two to four carbon atoms, such as methyl ethyl ketone, etc.; chlorinated solvents, such as 1,1,1-trichloroethane, methylene chloride, etc.

The adhesive composition of this invention can be prepared in any conventional manner. For example, the ingredients can be added to the solvent in any order, after which mixing can take place until a substantially homogeneous mixture is obtained. Such mixing can be carried out at room temperature and room pressure over a period of about 3 to about 4 hours.

The adhesive composition herein will consist essentially of the following components within the following ranges, assuming the presence of 100 parts by weight of the styrene-butadiene component in the final composition.

| Component | Parts By Weight Broad Range | Preferred |
|---|---|---|
| Tackifier | 20–125 | 35–100 |
| Calcium Carbonate | 60–500 | 75–400 |
| Solvent | 85–1500 | 100–600 |

If desired, a thixotropic agent, such as fumed silica, asbestos, etc., in an amount of about 0.5 to about 15 weight per cent, preferably about one to about ten weight per cent, based on the weight of the styrene-butadiene component composition and an antioxidant, such as 1,3,5-trimethyl-2,4,6-(3,5-ditertiarybutyl-4-hydroxylbenzyl)benzene, in an amount of about 0.1 to about five weight per cent, preferably about 0.25 to about 1.5 weight per cent, based on the weight of the styrene-butadiene component, can also be incorporated in the adhesive composition of this invention. The thixotropic agent can be used to control sag flow of the composition and the antioxidant to provide resistance toward oxidation.

The new composition of this invention is particularly useful in bonding wood to wood in the construction of housing, for example, in the laying of plywood subflooring, wall paneling, etc. It can also be used in bonding wood, hardboard, gypsum board and plastics to wood, concrete and metals.

DESCRIPTION OF THE PREFERRED EMBODIMENTS

The improved adhesive composition of this invention can be further understood by reference to the following. Compositions were prepared wherein a styrene-butadiene radial block copolymer, a tackifier, calcium carbonate having an average particle diameter of about $2.5 \times 10^4$ to about $5 \times 10^4$ A, and asbestos as a thixotropic agent, were added to toluene. These ingredients were then mixed for about four hours at atmospheric pressure and atmospheric temperature until a homogeneous composition was obtained. The compositions were then tested for their compressive shear strength in bonding dry plywood to dry lumber. Each piece of lumber and plywood was preconditioned by maintaining the same for 48 hours at $70 \pm 5°$ and a relative humidity of $50 \pm 10$ per cent. After bonding the plywood to the lumber with the compositions, the assembly was postconditioned by maintaining the same at a temperature of $70° \pm 5°$ F. and a relative humidity of $50 \pm 10$ per cent for 14 days. The assemblies were then tested for their compressive shear strengths following the procedures outlined in Performance Specifications AFG-01 prepared by American Plywood Association, Tacoma, Washington, May 1971. A compressive shear strength of at least 225 pounds is considered satisfactory for this purpose. The compressive shear strength is an indication of the shear force under compression that can be applied to the adhesive bond to cause rupture at the adhesive-substrate interface. The extrusion rates of the compositions were also determined. This was done by loading a six-ounce polyethylene cartridge (Model 250-C6, Semco) equipped with a 2½-inch tip (Model 254, Semco) having a ⅛-inch diameter orifice. The cartridge was then loaded into a Semco Sealant Gun (Model 250-6, Semco) with an air line for air pressure dispensation of the material. The material was dispensed in grams at a pressure of 60 pounds per square inch gauge per unit time, e.g., one minute. The extrusion rate is thus expressed in grams per minute. An extrusion rate of about 20 grams to about 300 grams per minute is considered satisfactory in use. A rate below about 20 grams per minute renders the composition difficult of application, while above about 300 grams per minute the bead might slump excessively and will have a tendency to run. The data obtained are tabulated below in Table I.

Referring to the components used in the adhesive compositions above, Solprene 406 and Solprene 411 are styrene-butadiene radial block copolymers made and sold by Phillips Petroleum Company having, respectively, a butadiene to styrene weight ratio of about 60/40 and 70/30 and molecular weights of about 250,000 and about 300,000. Piccoumaron 410 is a coumarone-indene resin made and sold by Pennsylvania Industrial Chemicals having a softening point of 100° C. Cumar LX-509 is a coumarone-indene resin made and sold by Neville Chemicals Company having a melting point of 155° C. The calcium carbonate has an average diameter of $5 \times 10^4$ A.

The data in Table I show that an adhesive composition consisting essentially of a styrene-butadiene radial block copolymer, or of a combination of styrene-butadiene radial block copolymers, a tackifier, calcium carbonate and an organic solvent possesses an extremely high compressive shear strength and an excellent extrusion rate. In fact the data obtained herein are comparable to those obtained in my said copending Application Ser. No. 456,165, now U.S. Pat. 3,923,722, which is otherwise similar, except that a linear styrene-butadiene block copolymer is used in place of the styrene-butadiene radial block copolymer used herein.

Obviously, many modifications and variations of the invention, as hereinabove set forth, can be made without departing from the spirit and scope thereof, and therefore only such limitations should be imposed as are indicated in the appended claims.

I claim:

1. An adhesive composition consisting essentially of a styrene-butadiene radial block copolymer, a tackifier, calcium carbonate and an organic solvent wherein the components thereof are present in the following ranges, assuming the presence of 100 parts by weight of the styrene-butadiene radial block copolymer in the final composition:

| Component | Parts by Weight |
|---|---|
| Tackifier | 20–125 |
| Calcium Carbonate | 60–500 |
| Solvent | 85–1500 |

, with the styrene-butadiene radial block copolymer having the following general configuration:

$$(A\text{-}B)_x Y,$$

where $A$ is a styrene polymer $b$ is a butadiene polymer $Y$ is a group derived from a polyfunctional compound having at least three reactive sites and $x$ is an integer from 3 to 5; the calcium carbonate has an average particle diameter of about $0.2 \times 10^4$ to about $50 \times 10^4$ A;

TABLE I

| Run Number | 1 | 2 | 3 | 4 | 5 | 6 | 7 | 8 | 9 |
|---|---|---|---|---|---|---|---|---|---|
| Solprene 411, Grams | 60 | 60 | 60 | 60 | — | — | — | 45 | 30 |
| Solprene 406, Grams | — | — | — | — | 60 | 60 | 60 | 15 | 30 |
| Piccoumaron 410, Grams | 30 | 30 | — | — | 30 | 30 | 30 | 30 | 30 |
| Cumar LX 509, Grams | — | — | 30 | 30 | — | — | — | — | — |
| 1,3,5-trimethyl-2,4,6 (3,5-ditertiary-4-hydroxybenzyl)benzene, Grams | 0.1 | 1 | 1 | 1 | 0.3 | 0.3 | 0.3 | 0.3 | 0.3 |
| $CaCO_3$, Grams | 120 | 120 | 120 | 120 | 120 | 120 | 120 | 120 | 120 |
| Asbestos, Grams | 12 | 12 | 12 | 12 | — | 12 | 6 | 6 | 6 |
| Toluene, Grams | 170 | 130 | 170 | 170 | 130 | 150 | 130 | 130 | 150 |
| Results |  |  |  |  |  |  |  |  |  |
| Extrusion Rate, Gm/Min | 86 | 24 | 150 | 86 | 60 | 100 | 300 | 40 | 75 |
| Compressive Shear Strength, Pounds | 401 | 399 | 465 | 456 | 437 | 438 | 466 | 423 | 447 | and the solvents being selected from the group consisting of hydrocarbon aromatics having from six to eight carbon atoms aliphatic hydrocarbons having from six to eight carbon atoms ketones having from two to four carbon atoms and chlorinated organic solvent.

2. The composition of claim 1 wherein the components thereof are present in the following ranges, assuming the presence of 100 parts by weight of the styrene-butadiene radial block copolymer in the final composition:

| Component | Parts by Weight |
|---|---|
| Tackifier | 35–100 |
| Calcium Carbonate | 75–400 |
| Solvent | 100–600. |

3. The composition of claim 1 wherein the styrene polymer will range from about five to about 60 weight per cent based on the weight of the radial block copolymer.

4. The composition of claim 1 wherein the styrene polymer will range from about 10 to about 50 weight per cent based on the weight of the radial block copolymer 5. The composition of claim 1 wherein the tackifier is a resin based on coumarone or indene.

6. The composition of claim 1 wherein the tackifier is a coumarone-indene resin.

7. The composition of claim 1 wherein the solvent is an aromatic hydrocarbon having from six to eight carbon atoms.

8. The composition of claim 1 wherein the solvent is toluene.

9. The composition of claim 1 wherein the calcium carbonate has an average diameter of about $2 \times 10^4$ A to about $25 \times 10^4$ A.

* * * * *